United States Patent [19]
Slootman et al.

[11] Patent Number: 5,822,357
[45] Date of Patent: Oct. 13, 1998

[54] PROCESS FOR MELTING A CHARGE IN A FURNACE

[75] Inventors: Frank Slootman, Saint Cyr l'Ecole; Nicolas Perrin, Boulogne Billancourt; Frédéric Viraize, Sceaux, all of France

[73] Assignee: L'Air Liquide, Societe Anonyme pour l'Etude et l'Exploitation des Procedes Georges Claude, Paris Cedex, France

[21] Appl. No.: 555,792

[22] Filed: Nov. 9, 1995

Related U.S. Application Data

[60] Provisional application No. 60/004,077 Sep. 21, 1995.

[30] Foreign Application Priority Data

Jun. 19, 1995 [FR] France ................................ 95 07308

[51] Int. Cl.$^6$ ............................................. F27D 1/00
[52] U.S. Cl. ........................... 373/72; 373/2; 373/85; 266/47; 75/530
[58] Field of Search ................................ 373/2, 8, 9, 72, 373/80, 81, 88, 85; 266/41, 47; 75/60, 530

[56] References Cited

U.S. PATENT DOCUMENTS

| | | | |
|---|---|---|---|
| 3,459,867 | 8/1969 | Estes | 373/81 |
| 4,249,719 | 2/1981 | Knuppel et al. | 266/47 |
| 4,827,486 | 5/1989 | Brotzmann et al. | 373/2 |
| 5,444,733 | 8/1995 | Coassin et al. | 373/72 |
| 5,572,544 | 11/1996 | Mathur et al. | 373/8 |

*Primary Examiner*—Tu B. Hoang
*Attorney, Agent, or Firm*—Young & Thompson

[57] ABSTRACT

A charge of scrap is melted in a furnace (1) with post-combustion of the fumes by injection of an oxygenated gas into the space in the furnace above the charge. During periods of post-combustion, the oxygenated gas is injected in the form of several jets each having a flow rate comprised between about 400 and 1200 Nm$^3$/h and an injector (11, 12) outlet speed comprised between about 50 and 150 m/s, preferably between about 500 and 900 Nm$^3$/h and between about 70 and 125 m/s. Several groups of injectors (11, 12) are used, having an outlet tangential component relative to the vertical axis (X—X) of the furnace (1), successive groups of injectors being disposed at different levels (N$_1$, N$_2$) and oriented in alternate circumferential directions. A portion of these injectors have a circumferential component in a first direction and a downward component at a first angle relative to the horizontal, and the other injectors have a circumferential component in an opposite direction and a downward component at a second angle different from the first angle. The oxygenated gas is oxygen having a purity of at least 90%.

11 Claims, 2 Drawing Sheets

PROCESS FOR MELTING A CHARGE IN A FURNACE

This application claims the benefit under 35 U.S.C. 119(e) of provisional application No. 60/004,077 filed Sep. 21, 1995.

BACKGROUND OF THE INVENTION

The present invention relates to a process for melting a charge in a furnace, particularly an electric furnace for melting scrap for the production of steel of the type in which fusion energy is imparted to the charge and with post-combustion of the fumes by injection of an oxygenated gas into the space in the furnace above the charge.

DESCRIPTION OF THE RELATED ART

By "oxygenated gas" is here meant a gas containing oxygen, which can in particular be superoxygenated air and preferably "pure" oxygen, which is to say having a purity of at least 90%.

The electric arc furnace is a means for the production of liquid steel using principally electrical energy. Nowadays, fossil energy is more and more used to increase the productivity of these furnaces.

Thus, the use of carbon, loaded in a ladle or injected by lances, permits the use of fossil energy. This energy is used only partially to the extent to which the combustion of carbon is incomplete. Thus, large quantities of CO are liberated from the oxidation of the carbon. This carbon monoxide is conventionally burned in a so called post-combustion chamber located beyond the furnace itself.

Optimal use of energy leads to the development of processes for the injection of oxygen above the metal bath undergoing fusion to effect in-situ post-combustion of the CO.

The means used industrially to effect this post-combustion consists essentially in supersonic injections of oxygen. The oxygen is injected either through lances or by burners used in a pure oxygen or superoxygenated mode.

SUMMARY OF THE INVENTION

The invention has for an object to improve the energy output of the post-combustion by maximizing both the energy liberated by this post-combustion and the corresponding energy transfer to the metallic bath, whilst ensuring increased lifetime of the refractory lining of the furnace and without excessive oxidation of the electrodes. This supposes promoting maximally the reaction $CO + \frac{1}{2} O_2 \rightarrow CO_2$, to the detriment of other undesired reactions, particularly iron oxidation reactions ($Fe + \frac{1}{2} O_2 \rightarrow FeO$, $CO_2 + Fe \rightarrow FeO + CO$).

To this end, the invention has for its object a process of the recited type, characterized in that, during post-combustion periods, there is injected the oxygenated gas in the form of several jets of which each has a flow rate comprised between about 400 and 1200 $Nm^3/h$ and an injector outlet speed comprised between about 50 and 150 m/s.

The process according to the invention can comprise one or several of the following characteristics:

- each jet has a flow rate comprised between about 500 and 900 $Nm^3/h$ and an injector outlet speed comprised between about 70 and 125 m/s;
- the furnace fumes are continuously analyzed, and said flow rate is adjusted as a function of the results of this analysis;
- the process being adapted for an electric furnace for melting scrap for the production of steel, the analysis of the fumes consists in a measurement of the concentration of carbon monoxide in the fumes;
- several injector groups are used, having at their outlet a tangential component relative to the vertical axis of the furnace, the successive groups of injectors being disposed at different levels and oriented in alternate circumferential directions;
- there is used a series of injectors all disposed at a same level, a portion of these injectors having a circumferential component in a first direction and a downward component at a first angle relative to the horizontal, and the other injectors having a circumferential component in the opposite direction and a downward component according to a second angle different from said first angle;
- the oxygenated gas is oxygen having a purity of at least 90%.

BRIEF DESCRIPTION OF THE DRAWINGS

An example of the practice of the process according to the invention will now be described with respect to the accompanying drawing, in which.

DESCRIPTION OF THE PREFERRED EMBODIMENTS

Figure 1:
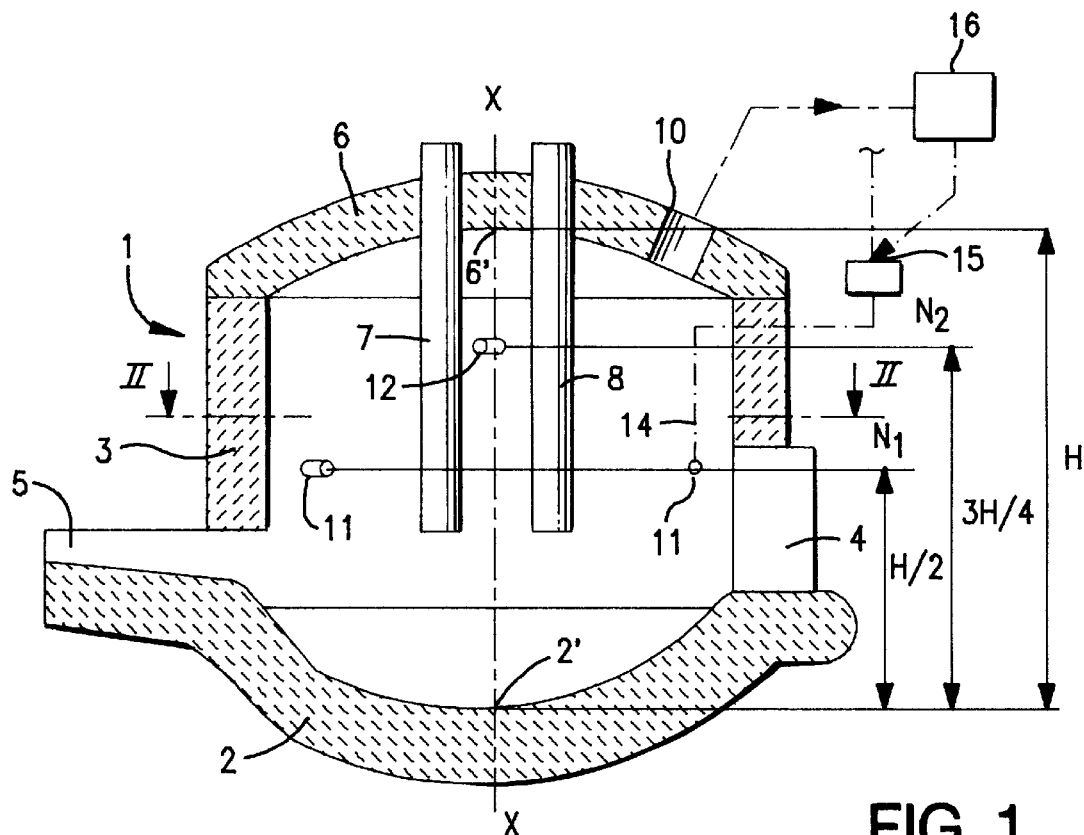
FIG. 1 is a schematic view in vertical cross section of an electric furnace for practicing the invention.
Figure 2:
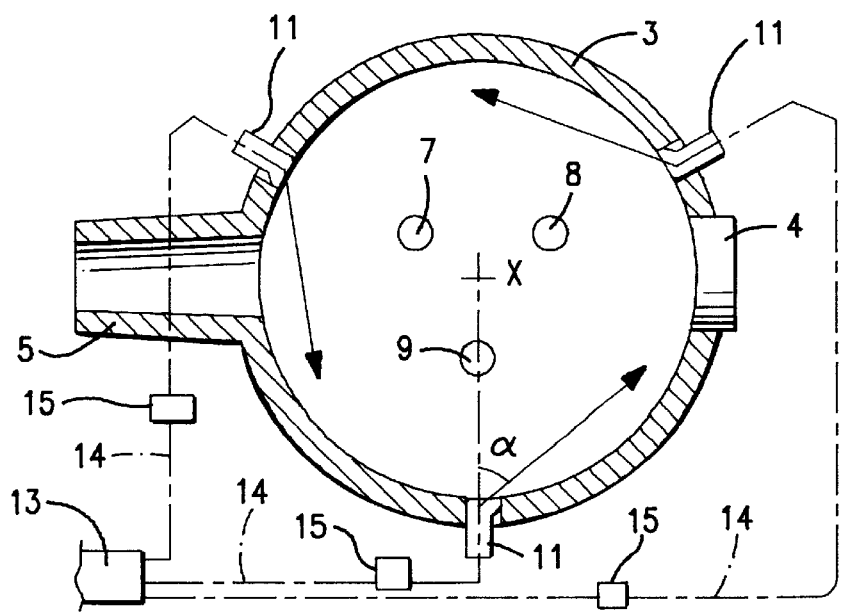
FIG. 2 is a schematic view taken in horizontal cross section on the line II—II of FIG. 1.

The electric arc furnace shown in FIGS. 1 and 2 is adapted to carry out the melting of scrap so as to produce steel. It comprises a hearth 2, a lateral wall 3 with a so-called clean-out door 4, and a pour spout 5 for melted product, as well as a vault 6 also forming the support for three electrodes 7, 8, 9 equally distributed about a vertical axis X—X. The vault comprises a fume outlet conduit 10.

The furnace is provided with at least two staged series of at least two, particularly at least three, oxygenated gas injectors, respectively, 11 and 12. The first series of injectors 11 is located at a level $N_1$ adjacent the midpoint of the height H between the lowermost pont 2' of the hearth 2 and the highest point 6' of the vault 6, whilst the second series of injectors 12 is located at a level $N_2$ which is approximately ¾ of this same height H. The injectors 11 on the one hand and 12 on the other hand are therefore located in two staged horizontal planes, whose vertical spacing is of the order of ¼ of the maximum height H of the vault. Each injector is oriented so as to have a principal tangential component and a radial centripetal component. The outlets of the lower series of injectors 11, at level $N_2 = H/2$ are all oriented, as seen from above, counter-clockwise, so as to form a lower gas current which circulates in counter-clockwise rotation (FIG. 2). The outlets of the injectors 12 of the upper series of injectors, at level $N_2 = 3H/4$ are all oriented, as seen from above, clockwise, so as to form an upper gas current with clockwise rotational circulation.

The injectors are supplied with oxygen of a purity of least 90% from a source 13 (FIG. 2) via respective conduits 14 provided with respective adjustment members 15.

The furnace also comprises an analyzer 16 of the carbon monoxide (CO) content in the fumes from the conduit 10, this analyzer having control means for the members 15 for adjusting the supply of the injectors 11 and 12 as a function of the measurements which take place continuously in real time.

Figure 3:
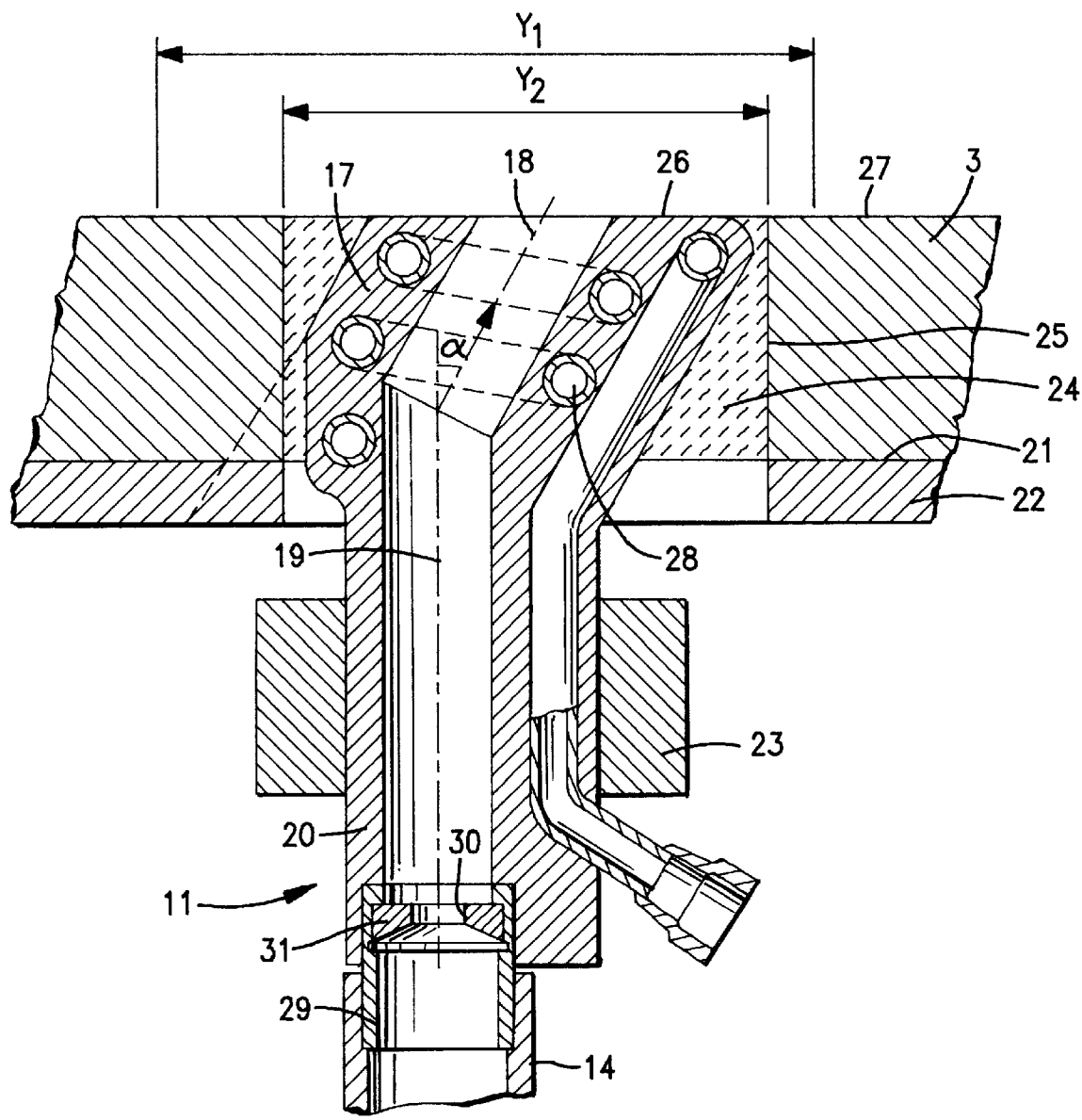
FIG. 3 is a longitudinal cross section, more detailed and on a larger scale, of an oxygen injector of the furnace.

Referring now to FIG. 3, in which it is seen that any one of the injectors 11, 12, for example one injector 11, comprises a head 17 disposed through the thickness of the wall 3 of the furnace and having a substantially cylindrical gas passage with an axis 18 inclined at an angle a to the radial axis 19 relative to the vertical axis X—X of the furnace shown in FIG. 1.

The head 17 is formed at the end of a generally cylindrical body 20 coaxial with the axis 19 when the injector is mounted in the furnace, this body being hollow and having a gas passage extending along axis 18 through the head, the body thus emerging from the external surface 21 of the wall 3 of the furnace, which wall is conventionally carried by a support structure 22 schematically shown in FIG. 2.

The body 20 of the injector is mounted for rotation about the axis 19 in a support bearing 23, also schematically shown in this figure. When rotational adjustment is effected, as a function of the peculiarities of the furnace, the position of the injector is fixed by means of a refractory filling material 24 disposed between the head 17 and the cylindrical opening 25 of the wall 3 which receives it. No matter what the adjustment, the front surface 26 of the head 17 is substantially flush with the internal surface 27 of the wall 3.

There is also shown in FIG. 3 a circuit 28 for circulation of a cooling fluid such as cold water. Other characteristics and advantages of such an injector are described in EP-A-0 127 492 in the name of the applicant.

A diaphragm 29 containing a fixed calibrated orifice 30 is mounted in a machined recess 31 provided in the rear end of the body 20 and the supply conduit 14 is connected to this device. The outlet diameter of the injectors is also fixed and very much greater than that of the opening 30. It is comprised between about 3 and 6 cm, preferably about 5 cm.

Moreover, as in the mentioned EP-A, the forward end of the conduit 14 can be provided with a protective non-return valve (not shown).

In operation, alternate steps are carried out of charging/tapping and of melting. During each step, the analyzer 16 compares the concentration of $CO_2$ in the fumes to a low reference value and correspondingly adjusts the supply of the injectors.

During all the operation, the flow of oxygen through the injectors is maintained between about 50 and 1200 $Nm^3/h$ (1 $Nm^3$ is one $m^3$ under normal conditions of temperature and pressure), and the outlet speed of the oxygen, given the dimensions of the injectors and the outlet pressure, which is substantially atmospheric pressure, is comprised between about 10 and 150 m/s. The preferred ranges of values are, for the flow rate of the injector, from 100 to 900 $Nm^3/h$ and, for the outlet speed, 15 to 125 m/s.

If the flow rate through the injector exceeds about 1200 $Nm^3/h$, there will be a high risk of rapid destruction of the refractory blocks which constitute the wall 3 of the furnace, and/or of oxidation of at least one electrode and/or of the metallic bath.

It has been found that with such a combination of parameters, the specific consumption of electricity, for a given specific consumption of oxygen, is particularly low. This has been established by tests on an industrial scale, carried out in a furnace of 85 tons capacity of the type shown in FIGS. 1–3, having six injectors of an outlet diameter of 50 mm, with a maximum flow rate per injector of 700 $Nm^3/h$ displayed on the regulation device 16 and a small protective flow from the injectors of about 50 to 70 $Nm^3/h$ during down times.

The electrical consumption, in this furnace, is substantially reduced when all the injectors are supplied, relative to the case in which four of the six injectors are supplied, for a substantially identical specific oxygen consumption. This shows the improvement of the performances of the post-combustion when the outlet speed of the injector of the oxygen jets is reduced.

The invention could also be practiced with other arrangements of injectors in the furnace. In particular, there can be used a series of injectors all disposed at the same level, a portion of these injectors having a circumferential component in a first direction and a downward component at a first angle relative to the horizontal, and the other injectors having a circumferential component in the opposite direction and a downward component at a second angle different from said first angle.

We claim:

1. In a process for melting a charge in a furnace by imparting melting energy to the charge and with post-combustion of fumes by injection of an oxygenated gas into the space in the furnace above the charge; the improvement comprising, during periods of post-combustion, injecting the oxygenated gas in the form of several jets each having a flow rate between about 400 and 1200 $Nm^3/h$ and having an injector outlet speed between about 50 and 150 m/s.

2. Process according to claim 1, wherein each jet has a flow rate between about 500 and 900 $Nm^3/h$ and has an injector outlet speed between about 70 and 125 m/s.

3. Process according to claim 1, further comprising continuously analyzing said fumes of the furnace, and adjusting said flow rate as a function of the results of this analysis.

4. Process according to claim 3, further comprising using an electric furnace for melting scrap for production of steel and analyzing the fumes, the analysis of the fumes comprising a measurement of the concentration of carbon monoxide in the fumes.

5. Process according to claim 1, wherein several groups of injectors are used, each having an outlet tangential component relative to the vertical axis of the furnace, said groups of injectors being disposed at different levels and oriented in alternate circumferential directions.

6. Process according to claim 1, wherein the oxygenated gas is oxygen having a purity of at least 90%.

7. In a process for melting a charge in a furnace by imparting melting energy to the charge and with post-combustion of fumes by injection of an oxygenated gas into space in the furnace above the charge, comprising:
  injecting, during periods of post-combustion, the oxygenated gas from several jets each having a flow rate between about 400 and 1200 $Nm^3/h$ and having an injector outlet speed between about 50 and 150 m/s,
  wherein a series of injectors are used, said injectors being all disposed at a same level, a portion of said injectors having a circumferential component in a first direction and a downward component at a first angle relative to a horizontal of the furnace, and the other injectors having a circumferential component in an opposite direction and a downward component at a second angle different from said first angle.

8. Process according to claim 7, wherein each jet has a flow rate between about 500 and 900 Nm$^3$/h and has an injector outlet speed between 70 and 125 m/s.

9. Process according to claim 7, further comprising continuously analyzing said fumes of the furnace, and adjusting said flow rate as a function of the results of this analysis.

10. Process according to claim 9, further comprising using an electric furnace for melting scrap for production of steel and analyzing the fumes, the analysis of the fumes comprising a measurement of the concentration of carbon monoxide in the fumes.

11. Process according to claim 7, wherein the oxygenated gas is oxygen having a purity of at least 90%.

\* \* \* \* \*